US007796788B2

(12) United States Patent
Waara

(10) Patent No.: US 7,796,788 B2
(45) Date of Patent: Sep. 14, 2010

(54) DEVICE AND METHOD TO INHIBIT RESIDUE ON PLATEN GLASS WHILE SCANNING

(75) Inventor: Patrick J. Waara, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1250 days.

(21) Appl. No.: 11/352,531

(22) Filed: Feb. 13, 2006

(65) Prior Publication Data

US 2007/0189821 A1 Aug. 16, 2007

(51) Int. Cl.
*G06K 9/00* (2006.01)

(52) U.S. Cl. .................................................... 382/124

(58) Field of Classification Search ................. 399/379; 382/124, 322; 340/5.83; 356/71; 902/3; 283/68; 713/186
See application file for complete search history.

(56) References Cited

U.S. PATENT DOCUMENTS

| | | | | |
|---|---|---|---|---|
| 4,050,802 | A * | 9/1977 | Tanaka et al. | 399/93 |
| 4,129,376 | A * | 12/1978 | Yotsukura | 399/178 |
| 5,113,248 | A * | 5/1992 | Hibi et al. | 358/501 |
| 5,204,755 | A * | 4/1993 | Taga et al. | 358/400 |
| 5,264,948 | A * | 11/1993 | Imoto | 358/474 |
| 5,448,649 | A * | 9/1995 | Chen et al. | 382/126 |
| 5,942,761 | A * | 8/1999 | Tuli | 250/556 |
| 6,356,719 | B1 * | 3/2002 | Yoshiura | 399/45 |
| 6,748,193 | B2 * | 6/2004 | Hayashi | 399/361 |
| 7,119,934 | B2 * | 10/2006 | Yoshida et al. | 358/487 |
| 7,350,236 | B1 * | 3/2008 | Silverbrook et al. | 726/26 |
| 7,590,561 | B2 * | 9/2009 | Silverbrook et al. | 705/26 |
| 2003/0021961 | A1 * | 1/2003 | Ylitalo et al. | 428/195 |
| 2003/0170429 | A1 * | 9/2003 | Engle et al. | 428/195.1 |
| 2005/0280204 | A1 * | 12/2005 | Knierim et al. | 271/262 |

* cited by examiner

*Primary Examiner*—Daniel G Mariam
*Assistant Examiner*—Aklilu k Woldemariam
(74) *Attorney, Agent, or Firm*—James J. Ralabate

(57) ABSTRACT

In an electrophotographic marking system a guard is provided to prevent fingerprint smears or markings on a platen glass. When fingerprint images are made, oil and other debris from the fingers mark the platen and cause subsequent images to reproduce these markings. This guard protects the platen from said marks via a convenient and economical expedient.

8 Claims, 1 Drawing Sheet

DEVICE AND METHOD TO INHIBIT RESIDUE ON PLATEN GLASS WHILE SCANNING

FIELD

This invention relates, generally, to image-forming machines and methods and, more specifically, to the scanning and platen systems in an electrophotographic marking system.

BACKGROUND

Electrophotographic image-forming or marking systems and machines are used to transfer images onto paper or other medium in both printing, copying and facsimile systems. Generally, a photoconductor is selectively charged and optically exposed to form an electrostatic latent image on the surface. Toner is deposited onto the charged photoconductor surface. The toner has a charge, thus it will adhere to the photoconductor surface in areas corresponding to the electrostatic latent image. The toner image is transferred to the paper or other medium. The toned paper is heated by a fuser roller system for the toner to fuse to the paper. The photoconductor is then refreshed—cleaned to remove any residual toner and charge—to make it ready for another image. The imaged paper is then passed to a document output collection area or tray where the user collects the finished, permanently imaged paper or documents.

In this type of marking system, an original to be copied is generally placed upon a platen glass where it is scanned to form a latent electrostatic image on the photoreceptor. This latent image is eventually transferred to a final receiving member such as paper. If there are any marks or debris on the platen glass, these imperfections usually visibly show up on the final copy. For this reason, it is always recommended that the platen glass be kept clean and free of debris and other unwanted marks.

In some large offices, especially those concerned with security, printers, marking apparatus, copiers and duplicators are modified so that a code or identification means for the user is required before the marking apparatus becomes functional. In many such systems, a favored procedure is to require the fingerprints of the user for authentication before he or she could use the apparatus. In addition to user identification, law enforcement agencies, both public and private, take fingerprints of individuals for storage and later reference. This could be quite common at local police stations, governmental agencies such as the FBI and other agencies or private security firms.

To accomplish this imaging of fingerprints, the individual or subject's finger or thumb is placed on the platen glass and an electrophotographic image of his or her fingerprints are obtained. In placing the subject's hand or fingers on the platen, a residual oil from the subject's hand usually is left on the platen glass. This oil or some perspiration is reproduced and later could adversely affect the quality of other images commonly made on an electrophotographic apparatus. If the user forgets or neglects to wipe the platen glass clean after fingerprinting, subsequent copies will need to be repeated after the platen glass is cleaned of debris.

SUMMARY

The present embodiments of this invention provide a method to inhibit the fingerprint markings while also giving a target for the scanning area of the fingerprint. In an embodiment, a clear plastic guard that hinges next to the platen glass is enabled to be flipped onto the platen prior to scanning of one's fingerprints. This keeps any oil from the finger from marking the platen glass. Additionally, this transparent plastic guard has a green (or other color) rectangle on it to visually indicate where the user is to place his or her thumb for scanning.

This guard can be easily hinged against the periphery of the platen so that it will easily be moved onto the platen. The guard in one embodiment is similar to a hinged credit card sized transparency and it can be used, reused and cleaned when required. In another embodiment, the guard can be a one use disposable sheet that is on a roll and tearable off the roll similar to toilet tissue or plastic wrap. Obviously, any suitable shaped guard may be used, if desirable. The guard must be flexible enough to fit flush onto the platen so that there is nothing to obscure a clear scanning of the thumb or finger. Obviously, it must be clear and transparent for proper imaging. Any usable clear material can be used such as flexible acetates, polyurethanes, polystyrenes, polycarbonates or other suitable materials, including a clear paper.

It is important that the guard be directed to the same spot on the platen so that the same scanning target area is always provided. This is further ensured by placing a colored rectangle or circle or other suitable marking to indicate where the user is to place his or her finger for proper scanning.

The hinge can be easily removable so that a new guard can be used as a replacement for the old worn guard. Obviously, very relatively inexpensive guards may be used so that replacements may be conveniently made.

DETAILED DISCUSSION OF DRAWINGS AND PREFERRED EMBODIMENTS

Figure 1:
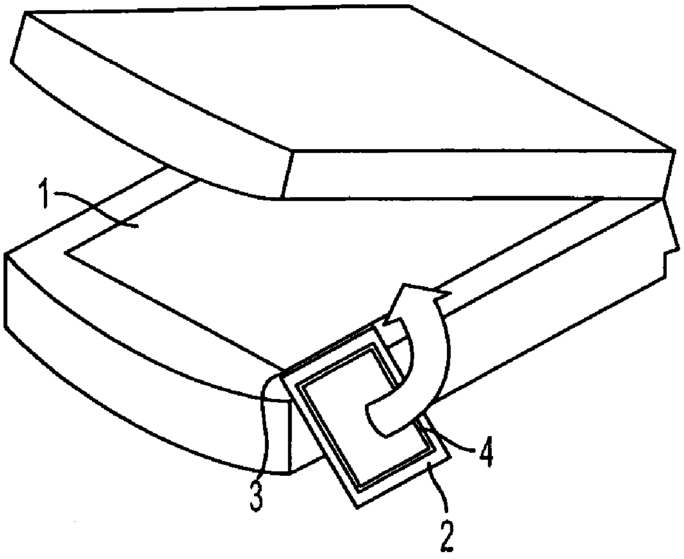
FIG. 1 illustrates a card-like transparent guard that is movably hinged near a platen glass for easy placement on the platen glass.

In FIG. 1, this embodiment proposes a device and method to inhibit fingerprints on the platen glass 1 when it is used for scanning a fingerprint for authentication and authorization purposes. The embodiment is a clear, plastic guard 2 that hinges on a hinge 3 next to the platen glass 1 such that a user can flip the guard 2 onto the platen 1 prior to scanning their fingerprint, thus keeping any oil from the finger from marking the platen glass 1. Additionally, this plastic guard 2 is proposed to have a green rectangle 4 (or other color or shape can be used for finger placement designation) on it to visually indicate where the user is to place their thumb for scanning. This embodiment also offers a potential supplies opportunity as these guards will eventually get dirty, wear out and need to be replaced.

The exact size and dimensions of the guard 2 are not relevant but it would be advantageous to put the guard near the start scan point to minimize the amount of scanner movement. In addition, the green rectangle 4 will be detected by the pre-scan so the user can be warned that there is something on the scanner and no jams will be caused by someone leaving the guard 2 on the platen 1 after being authenticated by the scanner. This embodiment avoids fingerprints on the platen 1 when it is used for scanning not only fingerprints but also subsequent images including those that are not fingerprints.

The guard 2 is a clear plastic guard made from any transparent plastic or other suitable material. The guard 2 can be of any suitable configuration or material; thus any shape guard is included in the present invention. This embodiment provides a low cost means for addressing the unwanted fingerprint problem on platens of the prior art. This embodiment can be used with any platen 1 scanner including dedicated fingerprint platens and scanners. The guard 2 is always movable to the same location on platen 1. The guard 2 can easily be replaced when required.

Figure 2:
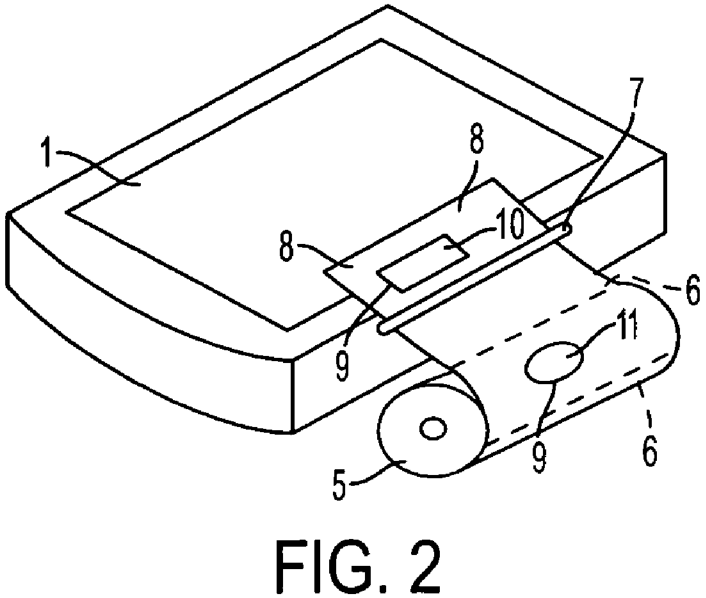
FIG. 2 illustrates a roll like a perforated tear-off transparent guard hinged near a platen glass for placement of a roll segment on the platen.

In FIG. 2, a second embodiment is illustrated wherein a transparent unwindable roll 5 having tear-off perforations 6 is used. In this embodiment, a snap down spring-loaded hinge 7 is used to ensure that the guard 8 is always in the same position on platen 1. Here, finger placement designations 9 may be any suitable form or color such as rectangle 10 or circle 11. The roll 5 has perforated sections 6 that can easily be torn when the guard 8 is set in place. This embodiment has many advantages since the transparent and clear roll 5 is easily manufactured and lasts for an extended period of time. Any shape or color for finger placement may be used and printed on each guard sheet 8. Any shape guard 2 may be used, if suitable.

In summary, the embodiments of this invention comprise a platen glass section of an electrostatic marking system useful for making fingerprint images. This section comprises in an operative arrangement, a flat platen glass (platen), a transparent and clear guard and a hinge. The hinge is movably connected to a portion adjacent said platen glass. The platen comprises a portion that is enabled to be scanned when in a fingerprinting imaging mode. This portion coincides with a location on the platen where the guard is enabled to be moved onto the platen and secured thereon. The guard is adapted to be moved to the exact location on each fingerprint imaging run. The guard is also enabled to be replaced after wear and usage by either replacement of the guard alone or the guard and hinge. The guard is enabled to prevent finger oil and other debris from contacting the platen. This portion is enabled to be detected by a pre-scan if left on the platen after the fingerprint imaging run.

This platen section is constructed wherein the guard is enabled to be placed on the platen near a scan start point in order to minimize the amount of scanner movement.

The preferred and optimally preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A method for reproducing a fingerprint on an electrophotographic marking machine, said method comprising:

providing a substantially flat platen glass having a transparent, clear guard movably attached to said platen glass, moving said guard onto said platen so that it fits flush onto a surface of said platen, directing said guard to a same spot on said platen to ensure that a same scanning target area is always provided, providing a platen scanner including a dedicated fingerprint scanner, and placing a finger or thumb of a user on said guard, scanning said finger or thumb to reproduce by said marking machine a fingerprint image thereof.

2. The method of claim 1 wherein said guard has a colored designation thereon to visually indicate where the user is to place their thumb or finger during scanning.

3. The method of claim 1 wherein said guard is in a form of a movably hinged guard, hinged adjacent an edge portion of said platen glass.

4. The method of claim 1 wherein said guard is in a form of an unwindable roll of perforated tear-off guards, said guard positioned adjacent an edge portion of said platen glass.

5. The method of claim 1 wherein said guard is placed on said platen glass near a start scan point to minimize thereby an amount of scanner movement during scanning of said finger or thumb.

6. The method of claim 1 wherein said guard is configured to be replaced after wear or usage.

7. The method of claim 1 wherein any suitable shape or color area is printed and marked on said guard designated for finger placement during scanning.

8. The method of claim 1 wherein said guard is configured to be detected by a pre-scan if said guard is left on said platen after a fingerprint imaging, so that said guard does not interfere with future non-finger imaging.

* * * * *